(12) United States Patent
Gagnon et al.

(10) Patent No.: US 7,227,756 B2
(45) Date of Patent: Jun. 5, 2007

(54) POWER SUPPLY KEYING ARRANGEMENT FOR USE WITH AN ELECTRICAL APPARATUS

(75) Inventors: Daniel Robert Gagnon, Harrodsburg, KY (US); Tommy Otis Lowe, Lexington, KY (US); David Kyle Murray, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 447 days.

(21) Appl. No.: 10/855,291

(22) Filed: May 27, 2004

(65) Prior Publication Data

US 2005/0275985 A1 Dec. 15, 2005

(51) Int. Cl.
*H05K 5/00* (2006.01)
(52) U.S. Cl. ............... 361/732; 361/786; 361/752
(58) Field of Classification Search ............ None
See application file for complete search history.

(56) References Cited

U.S. PATENT DOCUMENTS

| | | | | |
|---|---|---|---|---|
| 3,566,190 | A * | 2/1971 | Virgil et al. ............ | 361/690 |
| 4,546,414 | A * | 10/1985 | Donges ............ | 361/786 |
| 5,371,530 | A | 12/1994 | Hawkins et al. | |
| 5,398,161 | A * | 3/1995 | Roy ............ | 361/727 |
| 5,789,908 | A * | 8/1998 | LeVasseur ............ | 361/730 |
| 5,906,506 | A | 5/1999 | Chang et al. | |
| 5,955,797 | A | 9/1999 | Kim | |
| 5,963,224 | A | 10/1999 | Shimoda | |
| 6,174,037 | B1 | 1/2001 | Donahue et al. | |
| 6,199,969 | B1 | 3/2001 | Haflinger et al. | |
| 6,312,080 | B1 | 11/2001 | De Roos et al. | |
| 6,371,672 | B1 | 4/2002 | Pirie et al. | |
| 6,392,901 | B1 * | 5/2002 | Colver et al. ............ | 361/826 |
| 6,443,547 | B1 | 9/2002 | Takahashi et al. | |
| 6,474,770 | B1 | 11/2002 | Endo | |
| 6,501,659 | B1 * | 12/2002 | Bodensteiner et al. ...... | 361/732 |
| 6,504,730 | B1 * | 1/2003 | Cooney et al. ............ | 361/826 |
| 6,575,548 | B1 | 6/2003 | Corrigan et al. | |
| 6,663,209 | B2 | 12/2003 | Yoshida | |
| 2001/0033305 | A1 | 10/2001 | Tamura | |
| 2002/0111078 | A1 * | 8/2002 | Sevier et al. ............ | 439/680 |
| 2002/0118235 | A1 | 8/2002 | Narazaki et al. | |
| 2002/0130913 | A1 | 9/2002 | Murata | |
| 2003/0048323 | A1 | 3/2003 | Kaburagi | |
| 2003/0142159 | A1 | 7/2003 | Askeland et al. | |
| 2003/0179254 | A1 | 9/2003 | Okuda | |

* cited by examiner

*Primary Examiner*—Tuan Dinh
*Assistant Examiner*—Hung S. Bui
(74) *Attorney, Agent, or Firm*—Taylor & Aust, P.C.

(57) ABSTRACT

A power supply keying method for use with an electrical apparatus includes defining a plurality of power supply classes; associating with the plurality of power supply classes a plurality of power supplies, each of the plurality of power supplies including a power supply housing having a unique keying arrangement corresponding to one power supply class of the plurality of power supply classes; and providing in the electrical apparatus a power supply receptacle for receiving at least one power supply of the plurality of power supplies, the unique keying arrangement of the power supply housing in conjunction with the power supply receptacle permitting reception of a particular power supply of the plurality of power supplies into the power supply receptacle only if the power supply class associated with the particular power supply has power supply electrical characteristics that satisfy electrical power requirements of the electrical apparatus.

13 Claims, 6 Drawing Sheets

POWER SUPPLY KEYING ARRANGEMENT FOR USE WITH AN ELECTRICAL APPARATUS

BACKGROUND OF THE INVENTION

1. Field of the Invention

The present invention relates to power supplies for use in electrical devices, and, more particularly, to a power supply keying arrangement for an electrical apparatus.

2. Description of the Related Art

An electrical apparatus, such as an ink jet printer, typically requires a power supply to convert alternating current (AC) power, such as that available at a wall outlet at a user's home or office, to direct current (DC) power at a DC voltage level and current level suitable for use in the electrical apparatus. It is known to provide both internal and external power supplies for such an electrical apparatus.

For example, an ink jet printer having an internal power supply typically requires the user to simply attach an electrical cord from an AC connector located at the AC input of the internal power supply to an AC wall outlet. An advantage of the internal power supply is that it is easy for the user to apply electrical power to the printer. One disadvantage, however, is that if the printer power supply fails, then the entire printer must be sent to a service center for repair.

An ink jet printer having an external power supply typically requires the user to attach the DC output of the external power supply to the DC input of the ink jet printer and attach the AC input of the power supply to the AC wall outlet. An advantage of the external power supply is that in the event of a power supply failure, the power supply unit can be replaced without having to send the entire printer in to a service center for repair. However, typically, replacement of the power supply is limited to an exact replacement of the power supply.

What is needed in the art is a power supply keying arrangement for an electrical apparatus that permits a range of downwardly compatible power supplies to be used in the electrical apparatus.

SUMMARY OF THE INVENTION

The present invention provides a power supply keying arrangement for an electrical apparatus that permits a range of downwardly compatible power supplies to be used in the electrical apparatus.

The invention, in one form thereof, is directed to a power supply keying method for use with an electrical apparatus, including defining a plurality of power supply classes, each power supply class of the plurality of power supply classes having different power supply electrical characteristics from power supply electrical characteristics of other of the plurality of power supply classes; associating with the plurality of power supply classes a plurality of power supplies, each of the plurality of power supplies including a power supply housing having a unique keying arrangement corresponding to one power supply class of the plurality of power supply classes; and providing in the electrical apparatus a power supply receptacle for receiving at least one power supply of the plurality of power supplies, the unique keying arrangement of the power supply housing in conjunction with the power supply receptacle permitting reception of a particular power supply of the plurality of power supplies into the power supply receptacle only if the power supply class associated with the particular power supply has power supply electrical characteristics that satisfy electrical power requirements of the electrical apparatus.

The invention, in another form thereof, is directed to an electrical apparatus for use in a power supply compatibility scheme, wherein a plurality of power supply classes are defined, each power supply class of the plurality of power supply classes having different power supply electrical characteristics from power supply electrical characteristics of other of the plurality of power supply classes, the plurality of power supply classes being associated with a plurality of power supplies, each of the plurality of power supplies including a housing having a unique keying arrangement corresponding to one power supply class of the plurality of power supply classes. The electrical apparatus includes a frame, and a power supply receptacle connected to the frame. The power supply receptacle, in conjunction with the unique keying arrangement, permits reception of a particular power supply of the plurality of power supplies into the power supply receptacle only if the power supply class associated with the particular power supply has power supply electrical characteristics that satisfy electrical power requirements of the electrical apparatus.

The invention, in still another form thereof, is directed to a power supply keying method for use with an electrical apparatus having electrical power requirements and having a power supply receptacle for receiving a removable power supply, including providing a first power supply having a first power supply output capacity, the first power supply having a first housing with a first keying arrangement; and providing a second power supply having a second power supply output capacity that exceeds the first power supply output capacity, the second power supply having a second housing with a second keying arrangement that in conjunction with the power supply receptacle facilitates downward compatibility of the second power supply with the first power supply, and prohibits upward compatibility of the first power supply with the second power supply if the first power supply output capacity of the first power supply is insufficient to satisfy the electrical power requirements of the electrical apparatus.

An advantage of the present invention is that several power supply classes, i.e., types, each having a different wattage rating, may be safely used on a single electrical apparatus.

Another advantage is that downward compatibility permits a higher wattage power supply to be used in a lower wattage electrical apparatus, while preventing a lower wattage power supply from being used in a higher wattage electrical apparatus.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
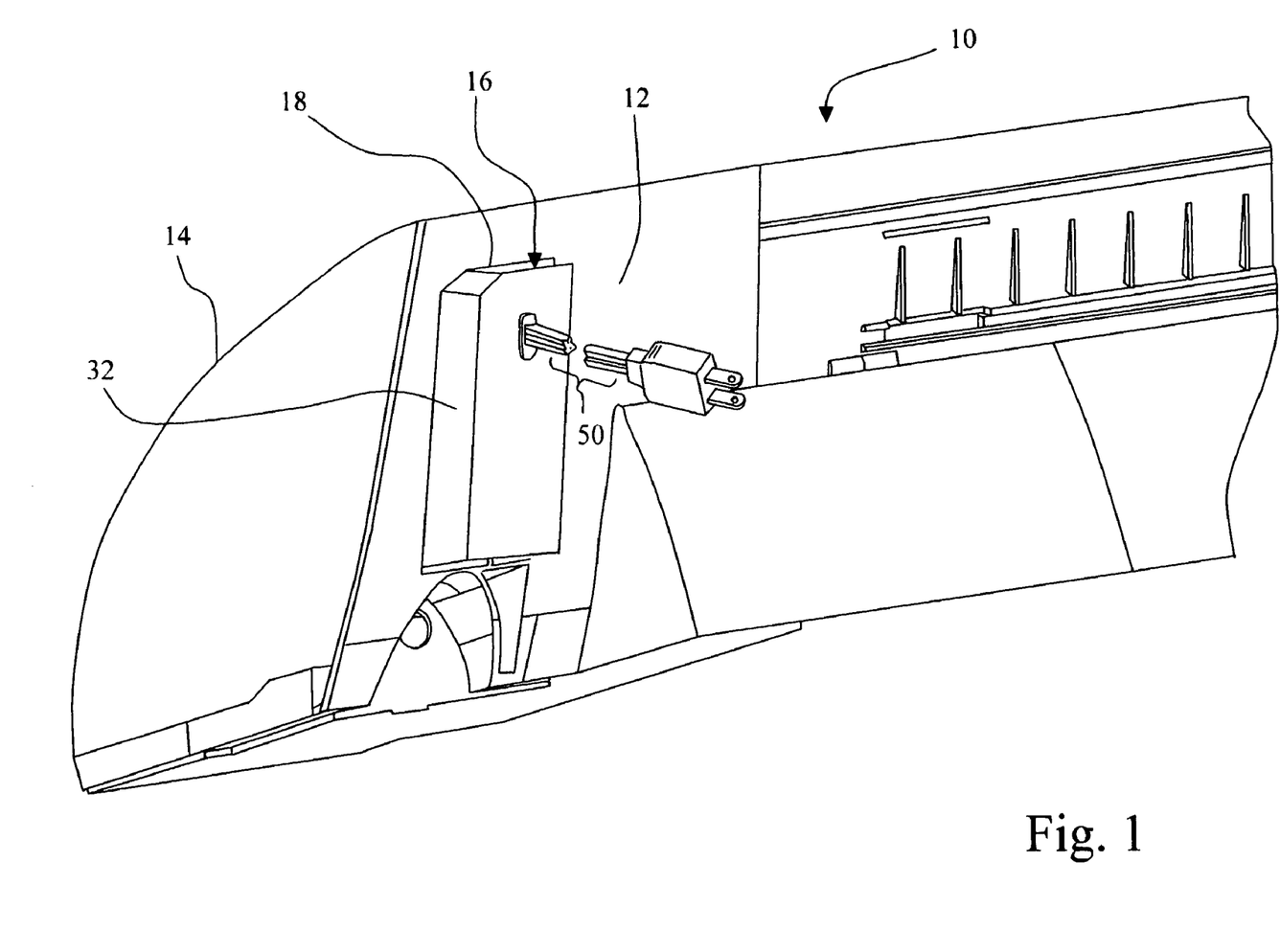
FIG. 1 is a perspective view of an electrical apparatus embodying the present invention.

Referring now to the drawings and particularly to FIG. 1, there is shown an electrical apparatus 10, such as for example, an imaging apparatus, which may be in the form of an ink jet printer. Electrical apparatus 10 includes a frame 12, a cover 14 and a removable power supply 16. A recessed power supply receptacle 18 is connected to, e.g., formed in, frame 12, and is configured to receive therein at least a portion of power supply 16. A latch mechanism (not shown) releasably holds power supply 16 in power supply receptacle 18. Power supply 16, when installed in power supply receptacle 18, is designed and configured to have power supply electrical characteristics, including an adequate power output capacity, for satisfying the electrical power requirements of electrical apparatus 10.

For example, if electrical apparatus 10 includes an ink jet print engine, then the electrical power requirements of electrical apparatus 10 will depend on the level of the power consumption by the electrical components, e.g., a sheet feed motor, a carrier drive motor, a controller, etc., in electrical apparatus 10, which receive power from power supply 16.

Figure 2:
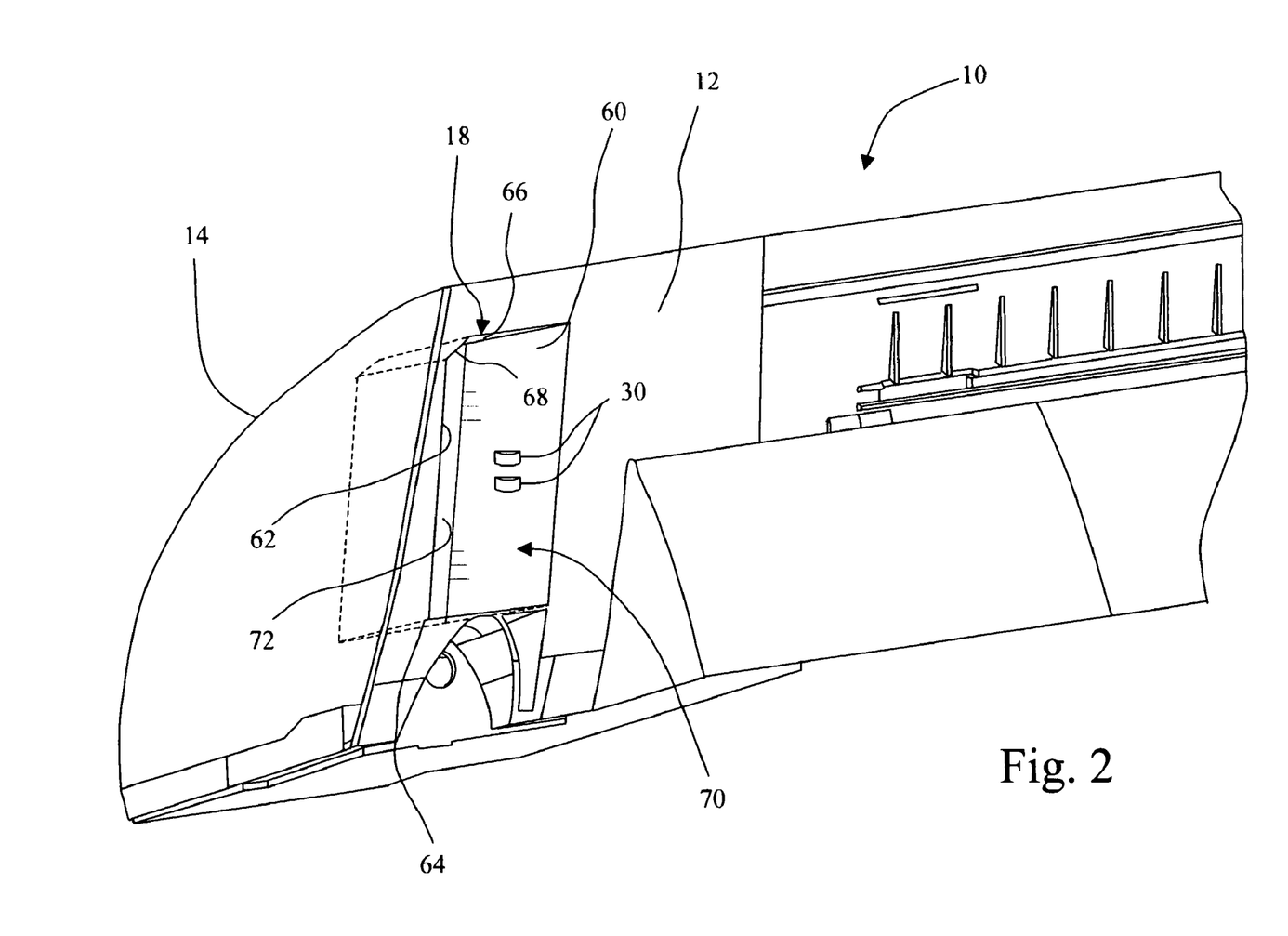
FIG. 2 is a perspective view of the electrical apparatus of FIG. 1 with the power supply removed.

Referring to FIG. 2, power supply receptacle 18 includes a first side wall 60, a second side wall 62, a base 64, a top wall 66 and a keying wall 68, which together define an inlet 70 for receiving power supply 16 having a corresponding shape. A rear wall 72 may be attached to each of first side wall 60, second side wall 62, base 64, top wall 66 and keying wall 68. Keying wall 68 is arranged diagonally, and is formed between second side wall 62 and top wall 66. Electrical contactors 30 may be located on one or more of walls 60, 62, 64, 66 and rear wall 72 in power supply receptacle 18 for engaging corresponding electrical contactors (not shown in FIGS. 1 and 2) of power supply 16 when power supply 16 is inserted into power supply receptacle 18.

As shown in FIG. 1, power supply 16 includes a power supply housing 32 for containing the electrical components forming the power supply. Power supply housing 32 includes a keying arrangement, which will be discussed in more detail below, that interacts with power supply receptacle 18 to assure electrical compatibility between power supply 16 and electrical apparatus 10.

Figure 3:
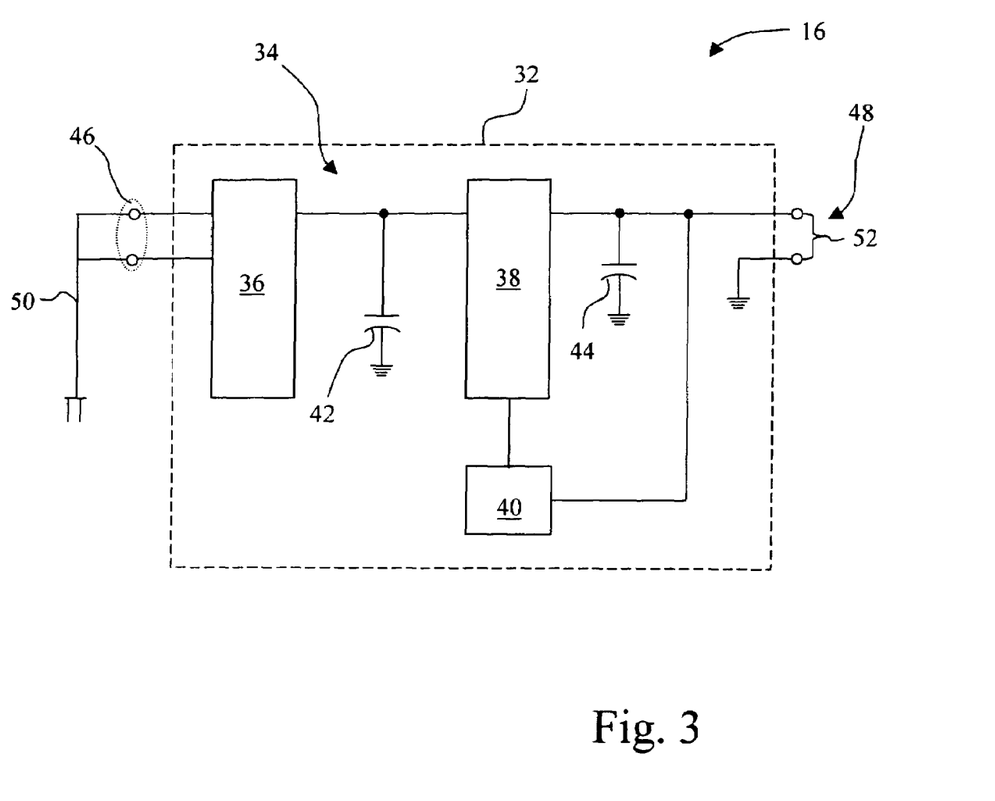
FIG. 3 is schematic diagram of the electrical components of an exemplary power supply for use as the power supply of FIG. 1.

Referring to FIG. 3, power supply 16 may be, for example, a switching type power supply which includes an electrical circuit 34 within housing 32 for converting an AC input signal, such as for example a 120 volt, 60 Hz input, into a voltage regulated DC output signal, such as a 12 volt DC output. Electrical circuit 34 operates in a manner well known in the art, and thus, will only briefly be described herein. Electrical circuit 34 includes an AC/DC converter 36, a transformer and switch circuit 38 and a controller 40. Also shown are low pass filter capacitors 42 and 44. AC/DC converter 36 includes an AC input 46, and transformer and switch circuit 38 includes a DC output 48. During operation, AC/DC converter 36 converts the AC input power signal received via an AC power cord 50 into an intermediate DC power signal, which in turn is filtered by the low pass characteristics of capacitor 42 before being supplied to transformer and switch circuit 38. Based on the feedback received from DC output 48, controller 40 supplies control signals to transformer and switch circuit 38 to generate the voltage regulated DC output power signal supplied to DC output 48 at output terminals 52, which in turn engage electrical contactors 30 (see FIG. 2) of electrical apparatus 10 to supply the DC output power signal to electrical apparatus 10.

In accordance with the present invention, it is desirable that multiple classes of power supplies be available for use as power supply 16 for electrical apparatus 10, so long as the power supply electrical characteristics, including power output capacity, satisfy (i.e., meet or exceed) the electrical power requirements of electrical apparatus 10. In this regard, the housings of such power supplies are designed to be downwardly compatible with respect to the electrical power requirements of electrical apparatus 10, but not upwardly compatible. For example, if the electrical power requirements for electrical apparatus 10 is 18 watts, the power supply housings of the various classes of power supplies may be configured with a unique keying arrangement that permits, for example, either of a 32 watt power supply or a 25 watt power supply to be inserted into power supply receptacle 18 of electrical apparatus 10, while prohibiting a 15 watt power supply from being inserted into power supply receptacle 18 of electrical apparatus 10.

Figure 4:
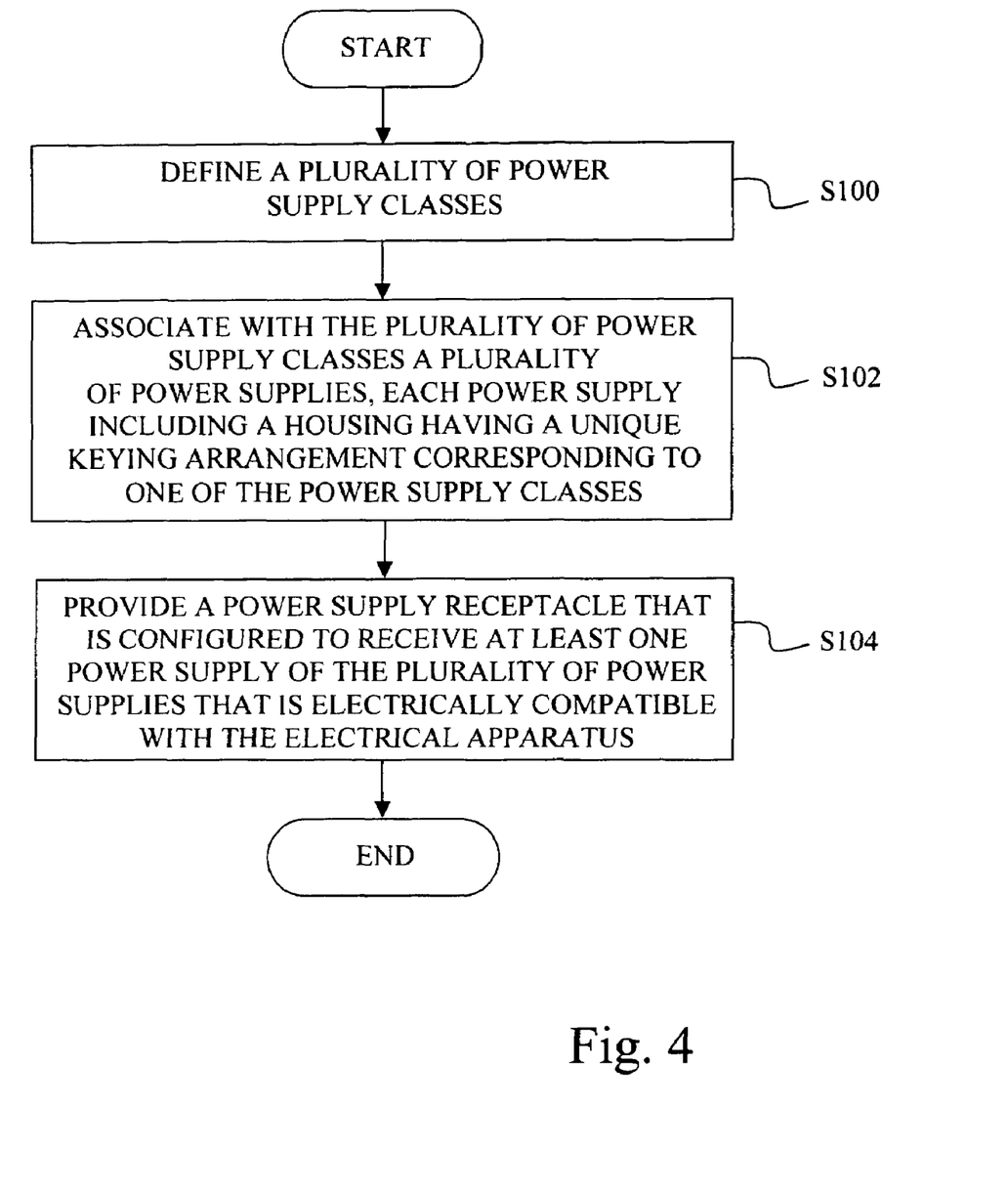
FIG. 4 is a flowchart of a method in accordance with the present invention.

The concepts of the present invention will now be described with respect to the flowchart of FIG. 4, in conjunction with the power supply receptacle and power supply keying arrangements illustrated in FIGS. 5 and 6.

At step S100, a plurality of power supply classes are defined. Each power supply class of the plurality of power supply classes has different power supply electrical characteristics from power supply electrical characteristics of other of the plurality of power supply classes. Referring to FIG. 5, for example, the power supply classes may include a 15 watt (W) power supply class, a 25 W power supply class and a 32 W power supply class.

At step S102, the plurality of power supply classes are associated with a plurality of power supplies. Each of the plurality of power supplies includes a housing having a unique keying arrangement corresponding to one power supply class of the plurality of power supply classes.

Figure 5:
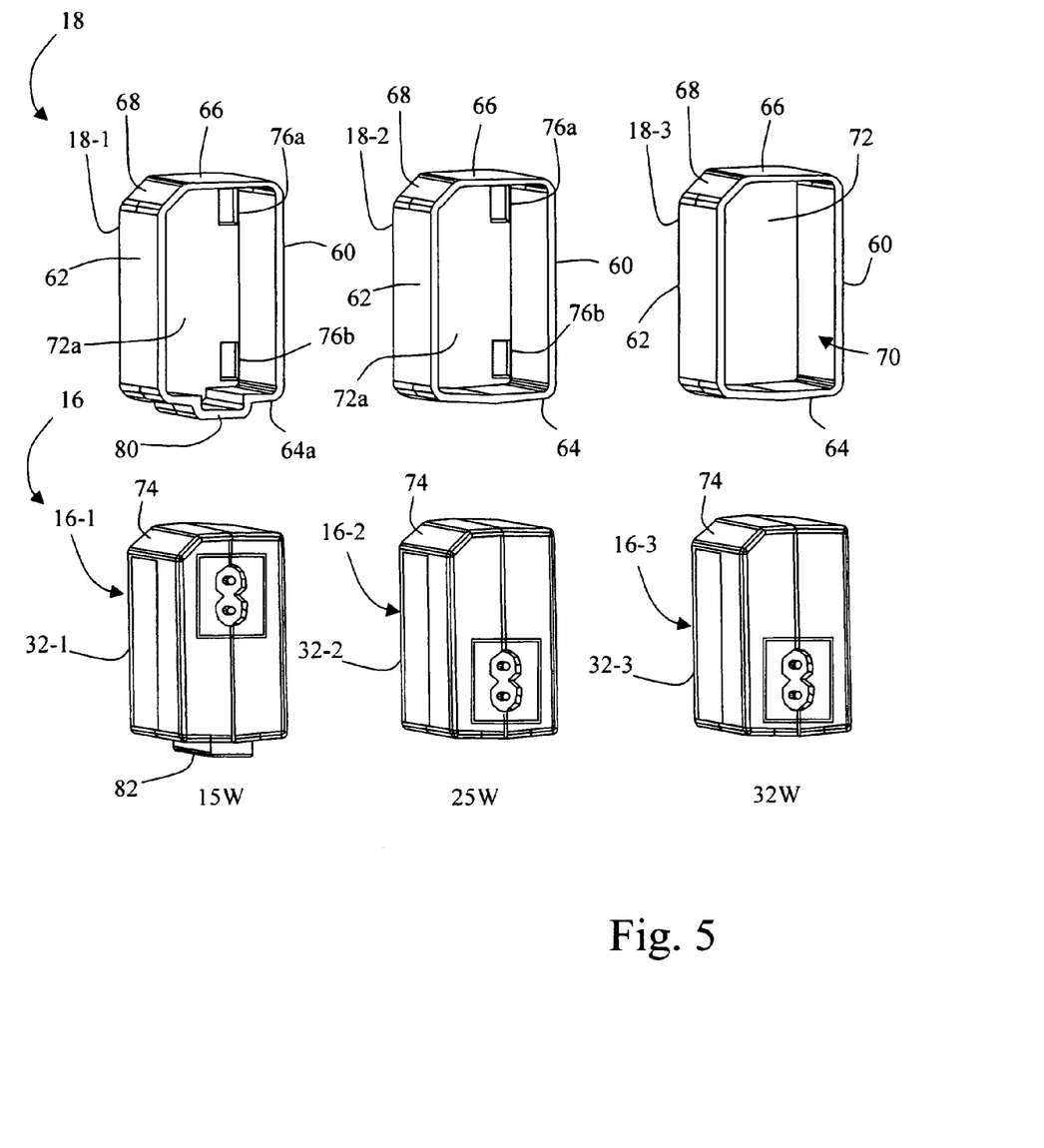
FIG. 5 shows a perspective view, from the power supply insertion direction, of a plurality of power supply receptacles suitable for use with the electrical apparatus of FIG. 1, and a set of downwardly compatible power supplies that may be used with one or more of the power supply receptacles.
Figure 6:
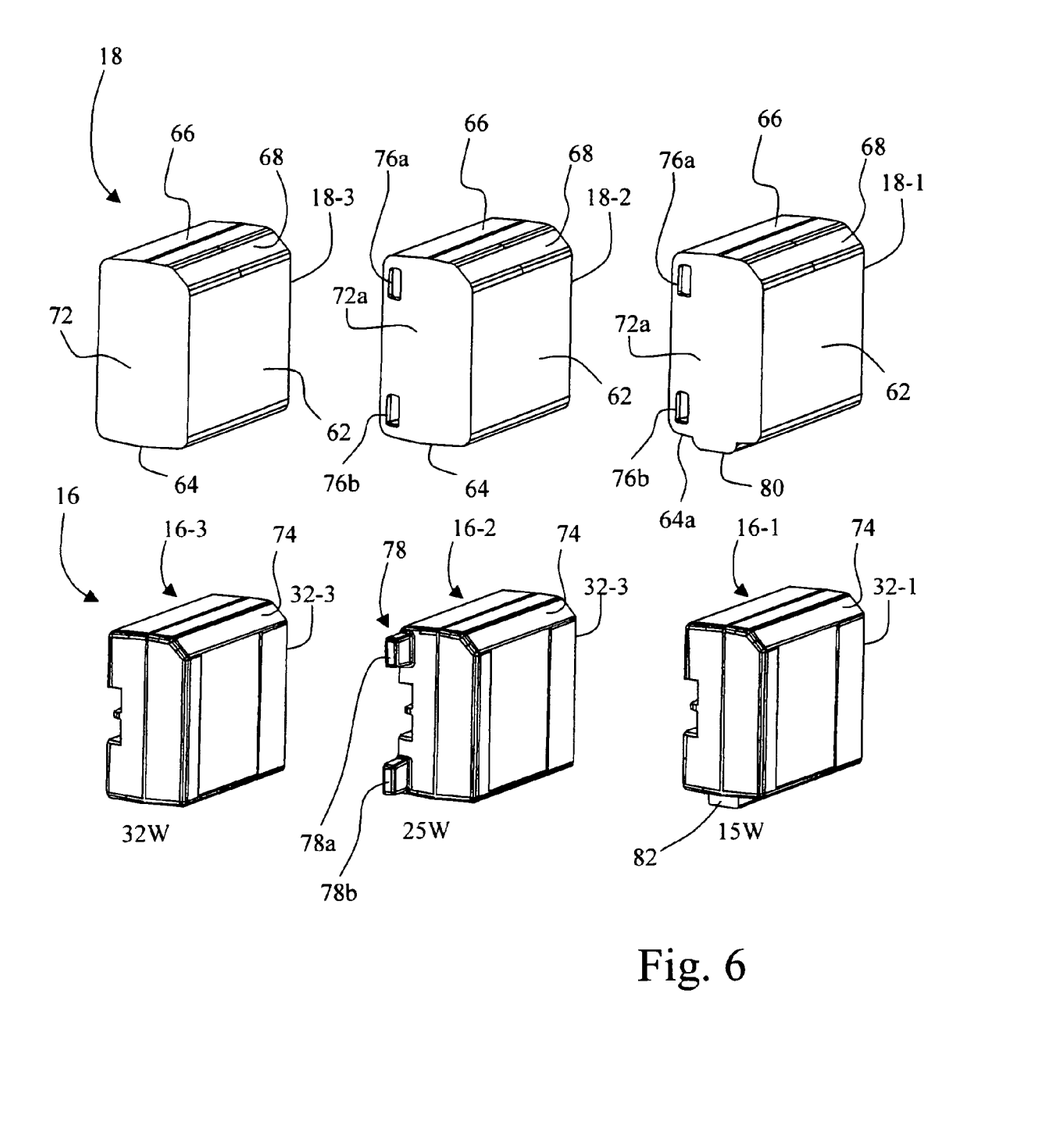
FIG. 6 is shows a perspective view, from a direction opposite the power supply insertion direction, of the plurality of the power supply receptacles and the set of downwardly compatible power supplies of FIG. 5.

For example, FIGS. 5 and 6 show three exemplary power supplies, respectively labeled 16-1, 16-2, and 16-3. Each of the three power supplies 16-1, 16-2, and 16-3 belong a particular power supply class, depending on the electrical characteristics, such as for example, output power, of the power supply. Each of power supplies 16-1, 16-2 and 16-3 has a power supply housing 32-1, 32-2 and 32-3, respectively, that includes a keying arrangement unique to the class to which the power supply belongs. For example, power supply 16-1 may belong to a 15 W power supply class as indicated by the keying arrangement of housing 32-1, power supply 16-1 may belong to a 25 W power supply class as indicated by the keying arrangement of housing 32-2, and power supply 16-3 may belong to a 32 W power supply class as indicated by the keying arrangement of housing 32-3.

At step S104, the power supply receptacle 18, e.g., one of power supply receptacles 18-1, 18-2 and 18-3, that is provided for electrical apparatus 10 may be configured to receive at least one power supply of the plurality of power supplies, e.g., 16-1, 16-2 and 16-3, that is electrically compatible with electrical apparatus 10. The unique keying arrangement of power supplies 16-1, 16-2, 16-3, in conjunction with the configuration of power supply receptacle 18, permit reception of a particular power supply of the plurality of power supplies 16-1, 16-2, 16-3 into power supply receptacle 18 only if the power supply class associated with the particular power supply has power supply electrical characteristics that satisfy electrical power requirements of electrical apparatus 10.

For example, in one implementation, power supply receptacle 18 is configured to receive at least two different power supplies, e.g., power supplies 16-2 and 16-3, of the plurality of power supplies 16-1, 16-2 and 16-3, with each of power supplies 16-2 and 16-3 being in a different power supply class from one another. More particularly, for example, power supply 16-1 may have a first power supply output capacity, based on its power supply class, and have a housing with a first keying arrangement. Power supply 16-2 may have a second power supply output capacity, based on its power supply class, that exceeds the first power supply output capacity of power supply 16-1, with power supply 16-2 having a second housing with a second keying arrangement. The keying arrangements of power supplies 16-1, 16-2 and 16-3, in conjunction with power supply receptacle 18, facilitates, for example, downward compatibility of the power supplies 16-2 and 16-3 with power supply 16-1.

If, for example, power supply 16-2 satisfies the electrical power requirements of electrical apparatus 10, then the keying arrangements of power supplies 16-1, 16-2 and 16-3, in conjunction with power supply receptacle 18, are configured to prohibit upward compatibility of power supply 16-1 with power supply 16-2 if the power supply output capacity of power supply 16-1 is insufficient to meet the electrical power requirements of electrical apparatus 10.

Thus, power supply receptacle 18 is configured such that the plurality of power supplies, e.g., 16-1, 16-2 and 16-3 are downwardly compatible with respect to electrical apparatus 10, based on unique keying arrangements of the plurality of power supplies, thereby preventing a particular power supply of the plurality of power supplies from being received into power supply receptacle 18 of electrical apparatus 10 if the power supply class associated with the particular power supply has power supply electrical characteristics that do not satisfy electrical power requirements of electrical apparatus 10.

The configuration of power supply receptacles 18-1, 18-2 and 18-3 respectively correspond to a power supply class having the minimum power supply characteristics capable of supplying an adequate amount of electrical power to electrical apparatus 10. If, for example, electrical apparatus 10 includes components requiring 25 W of continuous power, the configuration of power supply receptacle 18-2 will be selected for use as power supply receptacle 18 of electrical apparatus 10. However, for the 15 W, 25 W and 32 W power supply classes, the respective power supply housings 32-1, 32-2 and 32-3 are configured such that either of power supplies 16-2 and 16-3 is permitted to be inserted into power supply receptacle 18-2, but housing 32-1 of power supply 16-1 will be prohibited from being inserted into power supply receptacle 18-2.

As another example, if electrical apparatus 10 includes components requiring 15 W of continuous power, the configuration of power supply receptacle 18-1 will be selected for use as power supply receptacle 18 of electrical apparatus 10. However, for the 15 W, 25 W and 32 W power supply classes, the respective power supply housings 32-1, 32-2 and 32-3 are configured such that any of power supplies 16-1, 16-2 and 16-3 are permitted to be inserted into power supply receptacle 18-1.

As still another example, if electrical apparatus 10 includes components requiring 32 W of continuous power, the configuration of power supply receptacle 18-3 will be selected for use as power supply receptacle 18 of electrical apparatus 10. However, for the 15 W, 25 W and 32 W power supply classes, the respective power supply housings 32-1, 32-2 and 32-3 are configured such that power supplies 16-1 and 16-2 are prohibited from being inserted into power supply receptacle 18-3, but power supply 16-3 will be permitted to be inserted into power supply receptacle 18-3.

Referring to FIGS. 5 and 6, power supply receptacles 18-1, 18-2 and 18-3 differ from one another, yet each shares a common basic structure, e.g., shape. For example, the basic structure of power supply receptacle 18-3 may be shared by power supply receptacles 18-1 and 18-2. The first modified structure of power supply receptacle 18-2 is shared by power supply receptacle 18-1, but is not shared by power supply receptacle 18-3. The second modified structure of power supply receptacle 18-1 is not shared by either of power supply receptacles 18-2 and 18-3.

More particularly, in this example, the basic structure of power supply receptacle 18-3 includes first side wall 60, second side wall 62, base 64, top wall 66 and a keying wall 68, which together generally define inlet 70 for receiving a power supply of a corresponding shape. Rear wall 72 is attached to each of first side wall 60, second side wall 62, base 64, top wall 66 and keying wall 68. Keying wall 68 is formed between second side wall 62 and top wall 66, and is positioned to accept a first keying feature 74 common to each of power supplies 16-1, 16-2, 16-3. The general shape of perimetrical inlet 70 is common to each of power supply receptacles 18-1, 18-2 and 18-3.

Power supply receptacle 18-2 shares with power supply receptacle 18-3 the wall configuration of first side wall 60, second side wall 62, base 64, top wall 66 and keying wall 68. Power supply receptacle 18-2 differs from power supply receptacle 18-3, however, in that power supply receptacle 18-2 includes a modified rear wall 72$a$. In particular, power supply receptacle 18-2 is shown having openings 76$a$, 76$b$ in modified rear wall 72$a$ which are located to accept a second keying feature 78 (lugs 78$a$ and 78$b$, shown in FIG. 6) associated with power supply 16-2.

Power supply receptacle 18-1 shares with power supply receptacles 18-2 and 18-3 the wall configuration of first side wall 60, second side wall 62, top wall 66, and keying wall 68. Power supply receptacle 18-1 further shares with power supply receptacle 18-2 the modified rear wall 72$a$ that includes openings 76$a$, 76$b$. However, power supply receptacle 18-1 includes a modified base 64$a$, which distinguishes power supply receptacle 18-1 from power supply receptacles 18-2 and 18-3. In particular, power supply receptacle 18-1 is shown having an extended portion 80 located to accept a third keying feature 82, i.e., a protrusion, of power supply 16-1, which is not common to power supplies 16-2 and 16-3.

Thus, in the exemplary configurations illustrated in FIGS. 5 and 6, unique keying arrangements are provided for each of power supplies 16-1, 16-2, and 16-3, which are formed by a unique combination or subset of first keying feature 74, second keying feature 78 and/or third keying feature 82. Likewise, power supply receptacles 18-1, 18-2 and 18-3 are configured to accept an appropriate power supply, e.g., one or more of power supplies 16-1, 16-2 and 16-3, based on the electrical power requirements of electrical apparatus 10.

While this invention has been described with respect to embodiments of the present invention, the present invention can be further modified within the spirit and scope of this disclosure. For example, those skilled in the art will recognize that the location, shape, size and/or number of the keying features making up a particular keying arrangement may be changed, so long as the principles of the present invention are maintained. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power supply keying method for use with an electrical apparatus, comprising:

defining a plurality of power supply classes, each power supply class of said plurality of power supply classes having different power supply electrical characteristics from power supply electrical characteristics of other of said plurality of power supply classes;

associating with said plurality of power supply classes a plurality of power supplies, each of said plurality of power supplies including a power supply housing having a unique keying arrangement corresponding to one power supply class of said plurality of power supply classes; and providing in said electrical apparatus a power supply receptacle for receiving at least one power supply of said plurality of power supplies, said unique keying arrangement of said power supply housing in conjunction with said power supply receptacle permitting reception of a particular power supply of said plurality of power supplies into said power supply receptacle only if said power supply class associated with said particular power supply has power supply electrical characteristics that satisfy electrical power requirements of said electrical apparatus.

2. The method of claim 1, wherein said power supply receptacle is configured to receive at least two different power supplies of said plurality of power supplies, each of said at least two different power supplies being in a different power supply class than another of said at least two different power supplies.

3. The method of claim 1, wherein said plurality of power supplies are made to be downwardly compatible with said electrical apparatus based on unique keying arrangements of said plurality of power supplies, thereby preventing said particular power supply of said plurality of power supplies from being received into said power supply receptacle of said electrical apparatus if said power supply class associated with said particular power supply has power supply electrical characteristics that do not satisfy said electrical power requirements of said electrical apparatus.

4. The method of claim 1, said power supply housing having an outer shape providing said unique keying arrangement, and said power supply receptacle having a corresponding shape to receive said power supply housing.

5. An electrical apparatus for use in a power supply compatibility scheme, wherein a plurality of power supply classes are defined, each power supply class of said plurality of power supply classes having different power supply electrical characteristics from power supply electrical characteristics of other of said plurality of power supply classes, said plurality of power supply classes being associated with a plurality of power supplies, each of said plurality of power supplies including a housing having a unique keying arrangement corresponding to one power supply class of said plurality of power supply classes, said electrical apparatus comprising:

a frame; and a power supply receptacle connected to said frame, wherein said power supply receptacle, in conjunction with said unique keying arrangement, permits reception of a particular power supply of said plurality of power supplies into said power supply receptacle only if said power supply class associated with said particular power supply has power supply electrical characteristics that satisfy electrical power requirements of said electrical apparatus.

6. The electrical apparatus of claim 5, said power supply receptacle being configured to receive at least two different power supplies of said plurality of power supplies, each of said at least two different power supplies being in a different power supply class than another of said at least two different power supplies.

7. The electrical apparatus of claim 5, wherein said receptacle is configured such that said plurality of power supplies are downwardly compatible with said electrical apparatus based on unique keying arrangements of said plurality of power supplies, thereby preventing said particular power supply of said at least two different power supplies from being received into said power supply receptacle of said electrical apparatus if said power supply class associated with said particular power supply has power supply electrical characteristics that do not satisfy said electrical power requirements of said electrical apparatus.

8. The electrical apparatus of claim 5, said housing having an outer shape providing said unique keying arrangement, and said power supply receptacle having a corresponding shape to receive said power supply housing.

9. A power supply keying method for use with an electrical apparatus having electrical power requirements and having a power supply receptacle for receiving a removable power supply, comprising:

providing a first power supply having a first power supply output capacity, said first power supply having a first housing with a first keying arrangement; and providing a second power supply having a second power supply output capacity that exceeds said first power supply output capacity, said second power supply having a second housing with a second keying arrangement that in conjunction with said power supply receptacle facilitates downward compatibility of said second power supply with said first power supply, and prohibits upward compatibility of said first power supply with said second power supply if said first power supply output capacity of said first power supply is insufficient to satisfy said electrical power requirements of said electrical apparatus.

10. The method of claim 9, wherein if said electrical power requirements of said electrical apparatus is satisfied by both said first power supply and said second power supply, then either of said first power supply and said second power supply may be received in said power supply receptacle.

11. The method of claim 9, wherein satisfaction of said electrical power requirements of said electrical apparatus occurs only if said output capacity meets or exceeds said electrical power requirements of said electrical apparatus.

12. The method of claim 9, wherein if said electrical power requirements of said electrical apparatus is not satisfied by said first power supply but is satisfied by said second power supply, then as to said first power supply and said second power supply, only said second power supply may be received in said power supply receptacle.

13. The method of claim 9, wherein said electrical apparatus is an imaging apparatus.

* * * * *